United States Patent
Ketelaer et al.

(10) Patent No.: US 10,678,219 B2
(45) Date of Patent: Jun. 9, 2020

(54) METHOD AND DEVICE FOR PROCESSING A WORKPIECE ON A NUMERICALLY CONTROLLED MACHINE TOOL

(71) Applicant: SAUER GmbH, Stipshausen (DE)

(72) Inventors: Jens Ketelaer, Wiesbaden (DE); Manuel Praetorius, Rhaunen (DE)

(73) Assignee: SAUER GmbH, Stipshausen (DE)

( * ) Notice: Subject to any disclaimer, the term of this patent is extended or adjusted under 35 U.S.C. 154(b) by 0 days.

(21) Appl. No.: 15/671,517

(22) Filed: Aug. 8, 2017

(65) Prior Publication Data
US 2018/0039255 A1 Feb. 8, 2018

(30) Foreign Application Priority Data

Aug. 8, 2016 (DE) .......................... 10 2016 214 699

(51) Int. Cl.
*G05B 19/416* (2006.01)
*B23Q 17/09* (2006.01)
(Continued)

(52) U.S. Cl.
CPC ............ *G05B 19/416* (2013.01); *B23B 49/00* (2013.01); *B23Q 15/013* (2013.01); *B23Q 15/12* (2013.01); *B23Q 17/0952* (2013.01); *B23Q 17/20* (2013.01); *B23B 2260/128* (2013.01); *B23B 2270/10* (2013.01); *B23B 2270/48* (2013.01); *G05B 2219/45206* (2013.01)

(58) Field of Classification Search
CPC ........ G05B 19/416; G05B 2219/45206; B23B 49/00; B23B 2260/128; B23B 2270/10; B23B 2270/48; B23Q 15/013; B23Q 15/12; B23Q 17/0952; B23Q 17/20
See application file for complete search history.

(56) References Cited

U.S. PATENT DOCUMENTS 5,257,531 A * 11/1993 Motosugi .............. B23B 49/001
340/683
5,904,609 A * 5/1999 Fukuroda .............. B24B 37/005
451/285

(Continued)

FOREIGN PATENT DOCUMENTS

DE 10 2007 013055 A1 9/2008
EP 0 341 942 A2 11/1989
(Continued)

OTHER PUBLICATIONS

Jan. 2, 2018 Search Report issued in European Patent Application No. 17185214.8.

*Primary Examiner* — Thomas C Lee
*Assistant Examiner* — Michael Tang
(74) *Attorney, Agent, or Firm* — Oliff PLC (57) ABSTRACT

A method for processing a workpiece on a numerically controlled machine tool by a tool includes the steps of: controlling a relative movement of the tool relative to the workpiece for processing the workpiece, producing an ultrasonic vibration of the tool by an ultrasonic generator, detecting at least one sensor signal outputted from the ultrasonic generator and identifying a change in the material at the workpiece while controlling the relative movement of the tool relative to the workpiece on the basis of the at least one sensor signal outputted from the ultrasonic generator.

14 Claims, 4 Drawing Sheets

(51) Int. Cl.
  *B23B 49/00*  (2006.01)
  *B23Q 15/013* (2006.01)
  *B23Q 15/12*  (2006.01)
  *B23Q 17/20*  (2006.01)

(56) References Cited

U.S. PATENT DOCUMENTS

| | | | |
|---|---|---|---|
| 6,051,500 A * | 4/2000 | Maury | B24B 1/04 |
| | | | 156/345.13 |
| 8,926,235 B2 | 1/2015 | Moraru et al. | |
| 2006/0128283 A1* | 6/2006 | Fiebelkorn | B23B 37/00 |
| | | | 451/165 |
| 2012/0107062 A1 | 5/2012 | Moraru et al. | |
| 2016/0114494 A1 | 4/2016 | Carrasco | |
| 2016/0346956 A1* | 12/2016 | Takekawa | B28D 7/005 |
| 2017/0136552 A1* | 5/2017 | Fairchild | B23B 37/00 |
| 2019/0054583 A1* | 2/2019 | Dirscherl | B23Q 1/70 |

FOREIGN PATENT DOCUMENTS

| | | |
|---|---|---|
| EP | 2 591 870 A1 | 5/2013 |
| EP | 2 803 455 A1 | 11/2014 |
| FR | 2 944 722 A1 | 10/2010 |
| JP | 2005224891 A * | 8/2005 |
| JP | 2012187687 A * | 10/2012 |
| WO | 98/026739 A1 | 6/1998 |

\* cited by examiner

METHOD AND DEVICE FOR PROCESSING A WORKPIECE ON A NUMERICALLY CONTROLLED MACHINE TOOL

The present invention relates to a method for processing a workpiece by means of a tool on a numerically controlled machine tool. The present invention also relates to a device and a machine tool, on which the above mentioned method can be carried out. Furthermore, the present invention relates to a computer program product, by means of which the above mentioned method can be carried out.

BACKGROUND OF THE INVENTION

The prior art is familiar with machine tools where the rotary motion of the tool can be superimposed by an ultrasonic vibration of the tool, e.g. when a workpiece is machined by a tool.

EP 1 763 416 B1 describes in this connection a tool with a tool holder which, at a first end, has a tool holder support for adaptation to a rotary spindle nose and, at a second end opposite the first end, has a tool support, and with a tool head that can be inserted in the tool support, wherein the tool holder comprises a vibration motor.

In the case of such a machine tool, an ultrasonic generator in the tool holder, which produces the ultrasonic vibration of the tool, a vibrating body and the tool inserted in the tool holder provide a vibratory system which is excited by means of an electrical signal to mechanically oscillate, wherein the largest possible mechanical vibration amplitude is obtained when the vibratory system is stimulated with its resonance frequency.

When the tool is advanced into the workpiece, the vibratory system is dampened by the material of the workpiece and the friction between workpiece and tool, and the resonance frequency is shifted towards a somewhat lower resonance frequency. It is here known that the resonance frequency is further shifted with increasing damping.

This is quite often accompanied by the problem that there are marked fluctuations of the resonance frequency during processing. However, this simultaneously means that the damping capacity of the material that is being processed has changed.

This can be due to changes in the material inside the workpiece since in spite of an apparently homogeneous material of the workpiece an inhomogeneity (such as grain boundaries or inclusions of foreign material, etc.) can occur. On account of such changes in the material, it may be necessary to adjust the predetermined processing parameters, by means of which the tool processes the workpiece, to the respective material and its properties.

However, geometric changes in the workpiece, such as bores or recesses, are also a kind of inhomogeneity of the workpiece material, which optionally influences the predetermined processing parameters.

In order to determine when a change in the material occurs while the workpiece is processed, measurement systems are already known which utilize the principle of body-borne sound. Here, a corresponding body sound sensor is attached to the machine frame, usually at a considerable distance from the workpiece, said sensor measuring the arising vibrations and generating a measurement signal therefrom. A control unit assesses these measurement signals and can change the predetermined processing parameters during processing if measurement signal deviations are detected accordingly.

However, the drawback is that on account of the measurement sensor which is placed further away, the arising vibrations are not exclusively due to the change in the material inside the workpiece. These vibrations can be influenced or superimposed by vibrations from the environment. This can lead to wrong assessments of the measurement signal and, as a result, to a faulty adjustment of the processing parameters.

For this reason, it is important to detect, while the workpiece is processed, a change in the material as close as possible to the workpiece itself in order to avoid a superposition of external vibrations as far as possible.

SUMMARY OF THE INVENTION

Therefore, an object of the present invention is to provide a method for processing a workpiece on a numerically controlled machine tool, by means of which the above problems can be avoided.

A further object of the present invention is to provide a device, a machine tool and a computer program product, by means of which the method according to the invention can be carried out.

These objects are achieved by a method, a device, a machine tool, and a computer program product according to the embodiments described herein.

The method according to the invention for processing a workpiece on a numerically controlled machine tool by means of a tool comprises the steps of: controlling a relative movement of the tool relative to the workpiece for processing the workpiece, producing an ultrasonic vibration of the tool by means of an ultrasonic generator, detecting at least one sensor signal outputted from the ultrasonic generator and identifying a change in the material at the workpiece while the relative movement of the tool is controlled relative to the workpiece on the basis of the at least one sensor signal outputted from the ultrasonic generator.

The ultrasonic generator serves for inducing the tool to vibrate and also serves as a sensor for detecting the resonance frequency of the vibratory system. The advantage of this method is that the ultrasonic generator is arranged in the direct vicinity of the tool and in direct line with tool and workpiece. Therefore, the resonance frequency and thus the damping capacity of the respectively available material can be detected very close to the workpiece, which, in turn, reduces the influence of external vibration sources to a considerable degree.

In addition, a change in the material in the workpiece can precisely be recognized at the transition from one material to the next material, and this information can be transmitted appropriately to the controller of the tool.

An advantageous development of the method is that the control of the relative movement of the tool relative to the workpiece is carried out on the basis of predetermined processing parameters, wherein the method further preferably comprises the following steps: Adjusting the predetermined processing parameters when a change in the material at the workpiece is recognized on the basis of the at least one sensor signal outputted from the ultrasonic generator and/or controlling the relative movement of the tool relative to the workpiece on the basis of the adjusted processing parameters.

The predetermined processing parameters can be controlled depending on the sensor signals of the ultrasonic generator in order to appropriately process the respective materials with the parameters necessary for this purpose.

An additional advantage lies in the fact that a kind of "fingerprint" (e.g. a certain dampened resonance frequency of the vibratory system and/or a certain damping capacity of the material) can be generated and stored due to the greatest possible reduction in the influences of the outer vibration sources for each material.

This can be of great advantage e.g. in the case of composite materials since here widely differing materials (carbon fiber-reinforced plastic material with titanium/aluminum) are often combined with one another in a workpiece. This results in the desire or need to correspondingly adjust the processing parameters for every material. In the preliminary stage of processing, the respective layer thicknesses of the material were often programmed in on the basis of an accurate clamping, on account of which the processing parameters were then adjusted during processing.

However, since fluctuations in the layer thicknesses and irregularities in the clamping of the workpiece are automatically present, some of the materials were always processed with unsuitable processing parameters. By means of the method it is now possible to precisely identify a change in the material in the workpiece and then adjust the processing parameters to the respective material.

A further favorable development of the method is that the workpiece comprises at least two different material regions, and wherein in the step 'identifying a change in the material at the workpiece' a transition of the tool from one material region into the other material region of the workpiece is identified.

The above described method is here not limited to a confined number of changes in the material but can identify an indefinite number of material changes, on account of which the processing parameters of the tool can be adjusted.

In addition, the method can be advantageously developed such that the workpiece comprises a composite material, in particular a carbon fiber-reinforced composite material and/or a glass and/or ceramic material.

A limitation of the method to certain materials does not exist. Composite materials, glass and ceramics also advantageously leave a "fingerprint" (characteristic resonance frequencies and/or damping capacities), which can be stored and used for adjusting the predetermined processing parameters.

The method can advantageously be developed in such a way that the material regions are layers of different materials or material characteristics or that the material regions are material inclusions in the workpiece or that the material regions are bores and/or recesses in the workpiece.

Changes in material and/or material regions can be distinguished by different material properties and can also be characterized by geometric changes in the workpiece.

For example, it is possible that during processing the tool works its way from the material of the workpiece into a bore of the workpiece (perhaps also only in part). This also leads to a change in the resonance frequency and/or the damping capacity of the workpiece at this location and thus to a kind of change in the material. In this case as well, it may be desired to adjust the predetermined processing parameters.

The method can advantageously be developed in such a way that in the step 'identifying a change in the material at the workpiece' a contact of the tool with a surface of the workpiece is identified (i.e. e.g. a change in the material from air to the surface of the workpiece, in contrast to a change in the material in the workpiece).

The particularly great advantage is that a very fast approach to the workpiece can be ensured and thereby the processing time can be reduced. This is of advantage in particular in the case of materials that are highly breakable, such as glass or ceramics.

Workpieces made of such materials have been approached with high speed by means of the tool to date only to a predetermined safety distance, thereafter processing is continued with the predetermined processing parameters which are comparatively slow. If the safety distance chosen is too generous, processing time is unnecessarily wasted.

Due to the identification of the change in material (e.g. from air to the surface of the workpiece), the tool can be moved to the actual boundary from air to workpiece at high speed before an adjustment of the predetermined processing parameters to the corresponding material is carried out.

In addition, the method can be advantageously developed in such a way that in the step 'identifying a change in the material at the workpiece' a temporal change and at the same time a change in the value of one or more parameters of the sensor signal of the ultrasonic generator is detected as well.

The advantage of this development is that a change in the resonance frequency of the vibratory system can also have reasons other than a change in the material. The processing operation sometimes creates large amounts of heat which, to some extent, strongly heat the tool and also the workpiece.

This also considerably influences the resonance frequency of the vibratory system. However, it is possible to distinguish these influences from those of a change in material.

The resonance frequency of the vibratory system changes continuously and over a comparatively long period of time on account of heating the tool and/or workpiece. This is inconsistent with the occurrence of a change in material which manifests itself as an abrupt change in the resonance frequency.

It is here preferred to detect both the temporal change in one or more parameters of the sensor signal and the change in the value of the corresponding parameter/s of the sensor signal. Each sensor signal can have a noise, which manifests itself inter alia in temporally abrupt but very low changes in the parameter.

Therefore, it is not only the temporal change that is detected but preferably also the change in the value of the corresponding parameters. This combination forms the basis of an advantageous and reliable statement on the existence of a change in material.

The method can also be advantageously developed by the following step: determining whether the temporal change and the change in the value of the at least one sensor signal of the ultrasonic generator correspondingly falls below a predetermined modification time and simultaneously exceeds a predetermined modification value.

In addition to the detection of the temporal change and the change in the value of the parameters of the sensor signal, it is necessary to determine limit values for the respective changes in the sensor signal.

On this basis, an occurrence of a change in material can be largely distinguished from other factors (such as a temperature change on workpiece/tool) by being able to determine an exceeding or falling below of the limit values.

Furthermore, the method can advantageously be developed in such a way that the predetermined processing parameters are adjusted when the temporal change and the change in the value of the at least one sensor signal of the ultrasonic generator correspondingly falls below the predetermined modification time and simultaneously exceeds the predetermined modification value.

Due to the additional checking of the temporal change and the change in the value of the at least one parameter of the sensor signal it is possible to make a more reliable statement on the presence of a change in material. The risk of detecting an allegedly existing change in material on account of temperature changes in the tool and workpiece can markedly be minimized by means of this additional check.

A further advantageous development of this method is that the adjustment of the processing parameters comprises at least an adjustment of a speed or cutting speed and/or a feed of the relative movement of the tool. The predetermined processing parameters are preferably one or more of the following: the feed rate of the tool during the processing of the workpiece, the cutting speed of the machining cutting edges or portions of the tool and the speed of the tool (e.g. a spindle speed of a work spindle of a machine tool that drives the tool).

Therefore, certain predetermined processing parameters can be adjusted on account of a detected change in material, e.g. that of the main drive (e.g. spindle drive) for the rotation of the tool and/or the drive for the tool feed.

It is also an advantageous development of the method when the adjustment of processing parameters also comprises at least an adjustment of a frequency and/or a power of the ultrasonic generator.

It is not only the drives for the tool rotation and the feed of the tool that can be adjusted to the corresponding change in the material, the ultrasonic generator itself can also be adjusted to the requirements of the material. This can be e.g. the frequency, the amplitude and the power of the ultrasonic generator.

The method can advantageously be developed in such a way that the ultrasonic generator is a piezo actuator system.

The advantage of a piezo actuator system is that extremely high frequencies (ultrasound) can be produced by the very high dynamic behavior of the piezo crystals, wherein the piezo elements simultaneously are very robust and show a good linear control behavior.

The method can advantageously be developed in such a way that the tool has at least one geometrically defined cutting edge or at least one geometrically undefined cutting edge.

The method is not limited to either certain materials/substrates or certain tools and can therefore be used in a very broad range of applications.

The device according to the invention for use on a machine tool for processing a workpiece by means of a tool comprises as follows: a control unit for controlling a relative movement of the tool relative to the workpiece for processing the workpiece, an ultrasonic generator for generating an ultrasonic vibration of the tool and a detection unit for detecting at least one sensor signal outputted from the ultrasonic generator, wherein the device has an assessment unit for identifying a change in the material of the workpiece during the control of the relative movement of the tool relative to the workpiece on the basis of the at least one sensor signal outputted from the ultrasonic generator.

The machine tool according to the invention for processing a workpiece by means of a tool comprises as follows: a control unit for controlling a relative movement of the tool relative to the workpiece for processing the workpiece, an ultrasonic generator for producing an ultrasonic vibration of the tool, and a detection unit for detecting at least one sensor signal outputted from the ultrasonic generator.

It is thus possible to implement the above described method in a control device and/or a machine tool and to thereby allow the method to be used in already existing machine tools. This can be combined with previously described preferred aspects of the method.

The computer program product according to the invention here has as follows: a computer program stored in a computer-readable data storage medium, which can run on a numerical control unit of a numerically controlled machine tool or in a computer connected to a control unit of a numerically controlled machine tool and is configured to carry out the above described method.

As a result, the method can be implemented and carried out in an existing control software of a machine tool. This can be combined with previously described preferred aspects of the method.

Further aspects are described below which are advantageously usable for applying the method according to the invention or exemplary designs thereof.

A device for producing an ultrasonic vibration of a tool for the ultrasonic machining of a workpiece and for measuring ultrasonic vibration parameters of the ultrasonic vibration of the tool, in particular preferably for identifying a change in the material in and/or at the workpiece during processing, can comprise: a tool holder for receiving the tool, an ultrasonic transducer (ultrasonic generator) in the tool holder for generating the ultrasonic vibration of the tool, a sensor apparatus in the tool holder for generating a sensor signal on the basis of the ultrasonic vibration of the tool, and a sensor signal assessment device for assessing the sensor signal. The assessment device can be configured to carry out a change in the material in the workpiece during processing according to any of the above aspects on the basis of an assessment of the sensor signal.

For example, the ultrasonic transducer (ultrasonic generator) can be made as one or more piezo elements which also act as a sensor apparatus.

Therefore, a device is provided, by means of which an ultrasonic vibration of the tool can be produced and parallel thereto a direct measurement of the ultrasonic vibration parameters of the vibrating tool can be carried out, in particular preferably for identifying a change in the material in and/or at the workpiece during processing. An electrical sensor signal can be generated which permits a direct conclusion to be drawn as to the mechanical vibration. The sensor signal can be generated at one or more points in time or within a period of time during processing and can thus be updated at all times. Due to this it is possible to monitor the vibration and/or to detect changes in the vibration parameters, such as a reduction in the vibration amplitude or a change in the resonance frequency, in particular preferably for identifying a change in the material in and/or at the workpiece during processing.

The sensor apparatus preferably comprises one or more piezoelectric sensor elements and the sensor signal is preferably an electric voltage created by the ultrasonic vibration of the tool.

It is preferred that the tool holder can be rotated and the device has a sending element connected to the sensor apparatus in the tool holder and a receiving element spaced apart from the sending element for the contactless transmission of the sensor signal from the sending element to the receiving element.

The receiving element can here be arranged e.g. outside the tool holder in a stationary part of a machine tool with the device according to the invention. The sensor signal can be led out of the rotary tool holder for the purpose of assessment by means of the receiving element on the machine side that is spaced apart from the sending element.

It is preferred that the sensor apparatus has an insulating element for the electric insulation from the ultrasonic transducer and the device has an energy transfer device for transferring energy into the tool holder in order to provide the ultrasonic transducer with energy, wherein the energy transfer device is electrically insulated from the sending element and from the receiving element.

Due to the electric decoupling of the sensor apparatus and the sensor signal path in the tool holder from the ultrasonic vibration drive and the energy supply thereof, the tool vibration is detected in such a way that it is completely independent of the generation of the tool vibration so as to prevent a falsification of the sensor signal.

The sending element and the receiving element are preferably configured to transmit the sensor signal inductively from the sending element to the receiving element.

This form of contactless transmission has the advantage that neither an additional circuit nor energy supply in the tool holder nor a power adapter is necessary to lead the sensor signal out of the tool holder since the inductive transmission does not require any further energy.

The sending element and the receiving element preferably form a first transformer, wherein the sending element has a first ferrite core and a primary winding of the first transformer and the receiving element has a second ferrite core and a secondary winding of the first transformer, and the energy transfer device is made as a second transformer with a primary winding of the second transformer and a secondary winding of the second transformer, wherein the first transformer and the second transformer are arranged in such a way that the sensor signal is transmitted from the primary winding of the first transformer to the secondary winding of the first transformer in a substantially vertical direction to a direction relative to a transmission direction of the energy for the energy supply of the ultrasonic transducer from the primary winding of the second transformer to the secondary winding of the second transformer.

The advantage is that the respective magnetic fields of the two transformers are aligned vertically to one another such that energy supply and signal transmission hardly influence each other.

Alternatively, the sending element and the receiving element are configured to transmit the sensor signal optically from the sending element to the receiving element.

A machine tool according to the invention for the machining of a workpiece comprises the device according to the invention and a housing which accommodates both a stationary part of the energy transfer apparatus, which includes the primary winding of the second transformer and a first pot core of the second transformer, and the receiving element.

Therefore, the sensor signal can be guided into the stationary part of the machine tool where it can be assessed.

A method for measuring ultrasonic vibration parameters of a tool for the ultrasonic machining of a workpiece, in particular preferably for identifying a change in the material in and/or at the workpiece during processing, preferably comprises the steps of: setting the tool accommodated in the tool holder in an ultrasonic vibration; generating a sensor signal on the basis of the ultrasonic vibration of the tool by means of a sensor apparatus in the tool holder; passing the sensor signal from the sensor apparatus to a sending element connected to the sensor apparatus in the tool holder; transmitting the sensor signal from the sending element to a receiving element spaced apart from the sending element; passing the sensor signal from the receiving element to a sensor signal assessment device; assessing the sensor signal in the sensor signal assessment device for determining the ultrasonic vibration parameter of the tool, in particular preferably for identifying a change in the material in and/or at the workpiece during processing.

Therefore, an electric sensor signal is generated that allows to draw a direct conclusion as to the mechanical vibration, in particular preferably for identifying a change in the material in and/or at the workpiece during processing. The sensor signal can be generated at one or more points in time or in a period of time during processing. Therefore, the ultrasonic vibration parameters can constantly be updated and changes in the vibration can be detected continuously, in particular preferably for identifying a change in the material in and/or at the workpiece during processing.

When the sensor signal is assessed, a frequency of the ultrasonic vibration of the tool is preferably determined from a frequency of the sensor signal and/or an amplitude of the ultrasonic vibration of the tool from an amplitude of the sensor signal.

In this way, the resonance frequency changes in the vibratory system and/or a reduction in the amplitude can be determined in a simple way from the sensor signal, in particular preferably for identifying a change in the material in and/or at the workpiece during processing. On the basis of a comparison between the radiated frequency and the current resonance frequency the vibration system can thus be regulated in resonance if this is advantageous for the processing operation.

Further aspects and the advantages thereof as well as advantages and more specific design possibilities of the above described aspects and features are described from the following descriptions and explanations with respect to the attached drawings, which should, however, by no means be considered limiting.

DETAILED DESCRIPTION OF THE DRAWINGS AND PREFERRED EMBODIMENTS OF THE PRESENT INVENTION

Examples or embodiments of the present invention are described in detail below with reference to the enclosed drawings. The same or similar elements can be designated by the same reference signs in the drawings but sometimes also by different reference signs.

It should be noted that the present invention is, however, by no means limited or confined to the below described embodiments and the design features thereof but additionally comprises modifications of the embodiments, in particular those which are comprised by modifications of the features of the described examples or by combination of individual or a plurality of the features of the described examples within the scope of protection of the independent claims.

Figure 1:
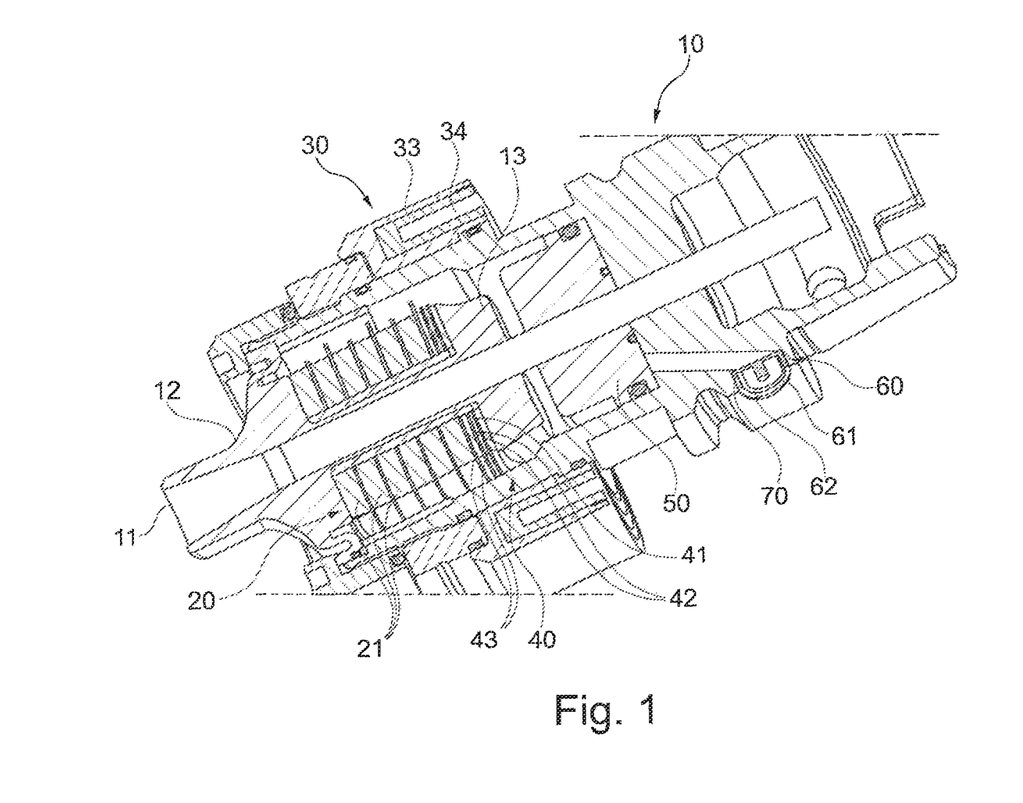
FIG. 1 shows a sectional view of a tool holder which can be used in embodiments of the method according to the invention.

FIG. 1 shows an exemplary structure of a tool holder 10, which can be used in the method according to the invention.

A tool receiving portion 11 for receiving a tool 90 (not shown in FIG. 1; see FIG. 4) is disposed at one end of the tool holder 10. A plurality, e.g. six, perforated disk-shaped first piezo elements 21 are arranged in the tool holder 10 e.g. as stacks, are connected to the tool receiving portion 11 e.g. via a transmission portion 12 and form e.g. an ultrasonic transducer 20 (ultrasonic generator) for transducing an electric voltage into a mechanical vibration (e.g. by means of a frequency in the ultrasonic range).

As an example, the mechanical vibration of the first piezo elements 21 is transmitted to the tool 90 via the transmission portion 12. The first piezo elements 21 can be made e.g. as piezo ceramic disks with electrodes mounted therebetween.

The energy of the ultrasonic transducer 20 is supplied e.g. via a transformer (first transformer) which on the machine side consists e.g. of a first pot core 31 and a primary winding 32 (not shown in FIG. 1; see FIG. 4) and on the tool side consists e.g. of a second pot core 33 and a secondary coil 34, which are arranged, by way of example, as annular elements on the outer side of the tool holder 10.

For example, a perforated disk-shaped piezoelectric sensor element 40 is arranged on a side of the stack comprising first piezo elements 21, wherein said side faces away from the tool receiving portion 11. The sensor element consists e.g. of a piezo element 41 and two contacts 42 and is coupled e.g. mechanically to the first piezo elements 21 but is insulated electrically from the first piezo elements 21 by means of an insulating element 43, which can consist of a ceramic perforated hole disk. By means of another insulating element 43, the piezoelectric sensor element 40 is, by way of example, electrically insulated from a fastening element 13, e.g. a fastening nut.

The fastening element 13 serves for fastening the piezoelectric sensor element 40 to the ultrasonic transducer 20 and for biasing the first piezo elements 21 owing to the dynamic load.

The first piezo elements 21 and the piezoelectric sensor element 40 have the same orientation, on the one hand, so as to allow the generation and the detection of the vibration in the same direction and, on the other hand, to achieve a space-saving arrangement of the elements in the tool holder 10.

The piezoelectric sensor element 40 converts the mechanical vibrations of the vibratory system, which consists of the tool 90, the transmission portion 12, the ultrasonic transducer 20 and the piezoelectric sensor element 40 into a sensor signal which, by way of example, is transferred as an electric voltage via a wire connection 50 from the piezoelectric sensor element 40 through the tool holder 10 to a sending element 61 and 62 on the outer side of the tool holder 10.

The sensor signal is transmitted e.g. in contactless fashion from the sending element 61 and 62 to a receiving element 81 and 82 (not shown in FIG. 1; see FIG. 4) on the machine side.

The sending element 61 and 62 is part of a further transformer (second transformer) and consists e.g. of a first ferrite core 61 and a primary winding 62; the receiving element 81 and 82 is also part of the second transformer and consists of a second ferrite core 81 and a secondary winding 82.

Therefore, the sensor signal can be transferred inductively from the tool holder 10 to a sensor signal assessment device on the machine side.

Alternatively, an optical transfer is also possible, wherein the sending element 61 and 62 is an LED and the receiving element 81 and 82 is a photodiode. The sending element 61 and 62 can be dimensioned and positioned in such a way that it fits into a bore 70 for a data chip for tool data according to the DIN 69893 standard. The tool holder 10 can be rotated in relation to a stationary part of the machine tool 1000 (not shown in FIG. 1; see FIG. 4).

Figure 2A:
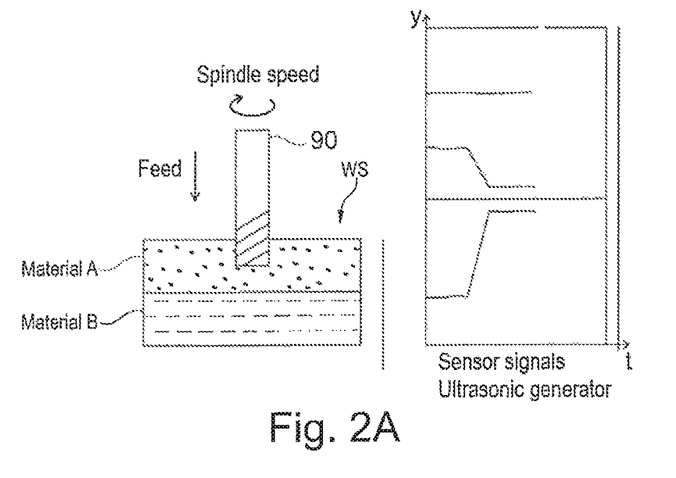
FIG. 2A shows schematically the processing of the multilayered workpiece according to the invention with corresponding sensor signals of the ultrasonic generator, wherein the tool processes the workpiece in the region of material A.

FIG. 2A shows schematically a processing operation of a machining tool 90 for the ultrasonic processing of a workpiece WS, which consists of a plurality of layers of different materials (material A and material B).

The diagram beside it shows the corresponding sensor signals (amplitude, frequency, power) of the piezo elements 21, wherein the diagram already shows the difference between the system which can vibrate freely (i.e. without damping) and the dampedly vibratory system by entering into the material A.

When entering into the material A, the vibratory system has to be provided with more power to produce a constant amplitude. However, at the same time the resonance frequency of the vibrator system changes towards a lower frequency since it is damped by the material A.

Figure 2B:
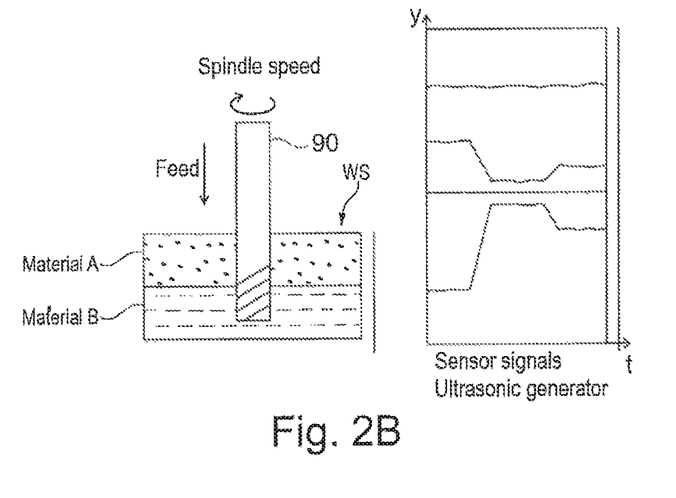
FIG. 2B shows schematically the processing of the multilayered workpiece according to the invention with associated sensor signals of the ultrasonic generator, wherein the tool processes the workpiece in the region of material B.

FIG. 2B shows schematically the processing operation after advancing the machining tool 90 into the second material B for ultrasonic processing. In this process, the sensor signals of the piezo elements 21 change as shown in the diagram beside it.

On the basis of the changed sensor signals, it is possible, for one thing, to identify the change in material in the workpiece, and it is also preferably possible to adjust the respective processing parameters, such as speed, cutting speed and/or tool feed, as well as the vibration parameters, such as parameters of the drive signals to the piezo elements 21 on the basis of the detected sensor signals and/or on the basis of the identification of the material change.

Figure 3:
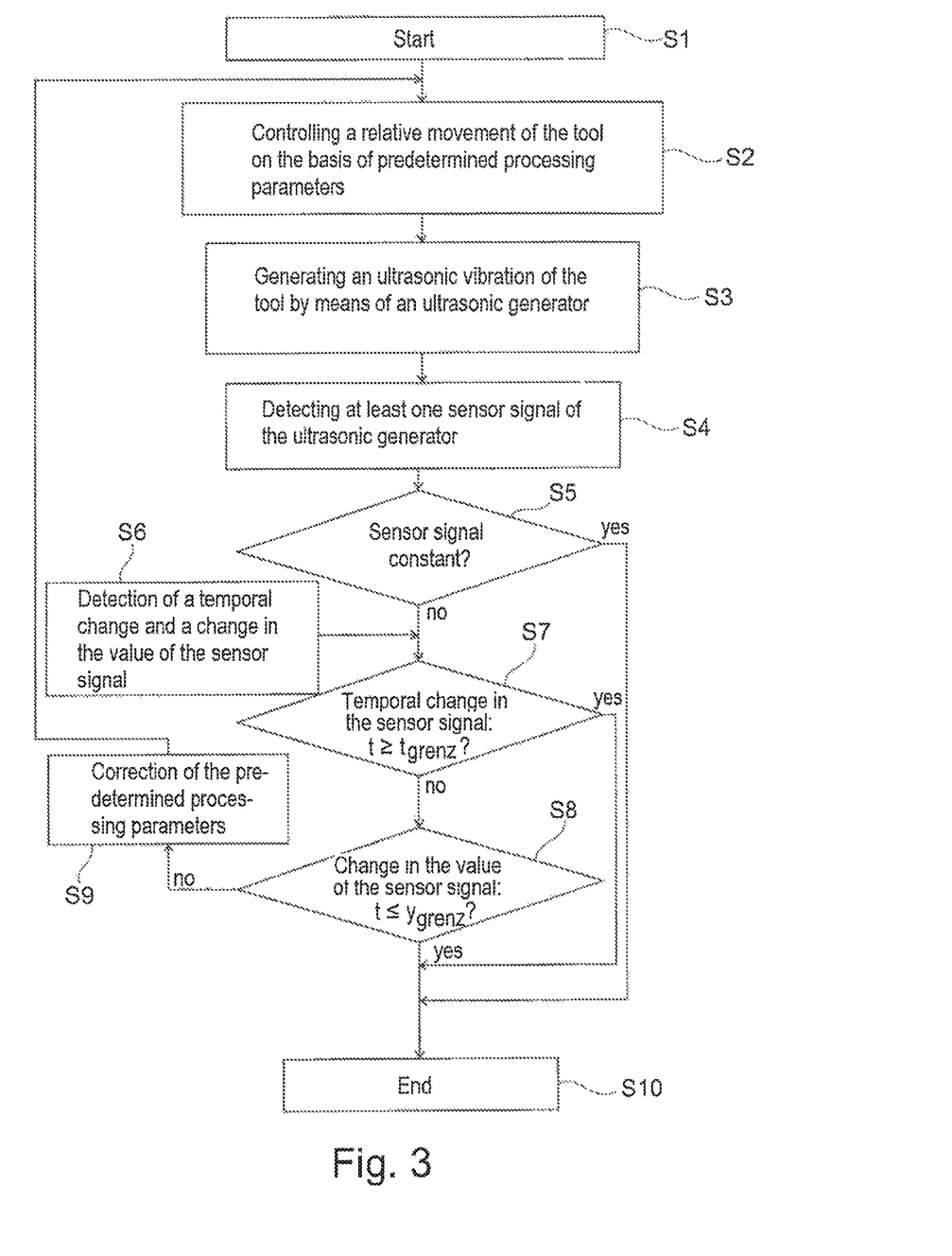
FIG. 3 shows a flowchart of an embodiment of the method according to the invention.

FIG. 3 shows a flow diagram of an embodiment of the method according to the invention. Here, the tool 90 is operated on the basis of predetermined processing parameters at the beginning of step S2. In the next step (S3), the ultrasonic vibration of the tool 90 is generated by the piezo elements 21, wherein the signals of the piezoelectric sensor elements 40, such as amplitude, frequency and power, are simultaneously detected (step S4).

In the next step, S5, the detected sensor signals are now assessed for the first time. It is here checked, for example, whether the detected signals are substantially constant (in the signal noise region). If this is not the case, a temporal change t of the respective sensor signal is detected in step S6, i.e. how quickly this signal changes, and the value change y of the respective sensor signal is simultaneously detected, i.e. how much or to what extent the corresponding signal changes.

These detected values are now compared in the following two steps S7 and S8 with predetermined limit values $t_{grenz}$ and $y_{grenz}$ to be able to determine, by means of this comparison, whether or not there is a change in material.

In step S7, the temporal change t is initially compared with the predetermined limit value $t_{grenz}$ for this purpose.

If the detected temporal change t is below the predetermined limit value $t_{grenz}$, a comparison is conducted in the next step, S8, as to how much the value y has changed. For this purpose, the detected value change y is compared with the predetermined limit value $y_{grenz}$. If the detected value change y exceeds the predetermined limit value $y_{grenz}$, the detected sensor signals point to a change in the material of the workpiece WS.

The above description can refer e.g. to the fact that the detected values comprise a frequency of the vibration generated on the tool holder and/or a detected power of the ultrasonic transducer 20.

On this basis, the predetermined processing parameters are adjusted in step S9. This can include an adjustment or change in the feed rate of the tool and/or an adjustment or change in the cutting speed or rotary speed of the tool while the workpiece is processed.

The parameter can here be adjusted as follows: Having detected the sensor signals of the piezoelectric sensor elements 40, they are compared, by way of example, with data sets which comprise already detected sensor signals of correspondingly known materials.

These data sets can comprise resonance frequencies e.g. of a tool-material combination or a damping capacity of a material and are characteristic of every known material (as a kind of "finger print"). If a match is here determined, the present material is identified and the processing parameters can be adjusted to the corresponding material on this basis.

However, if there is an unknown material, the kind of material concerned and/or the hardness degree and damping capacity of this material can be assessed on the basis of the detected sensor signals, and the processing parameters can be adjusted on this basis. Therefore, it is by way of example also possible to classify materials.

In the case of workpieces having known material compositions, it is also possible that various processing parameters or processing parameter sets are already predetermined for various materials or material layers of the workpiece, and when the change in the material of the workpiece is identified at the position of the tool tip of the tool, the processing parameters are adjusted to the processing operation in accordance with the predetermined different processing parameters or processing parameter sets.

However, if it is found in step S8 that the value change y of the corresponding sensor signal has not exceeded the predetermined limit value $y_{grenz}$, the method is continued with unchanged processing parameters.

Figure 4:
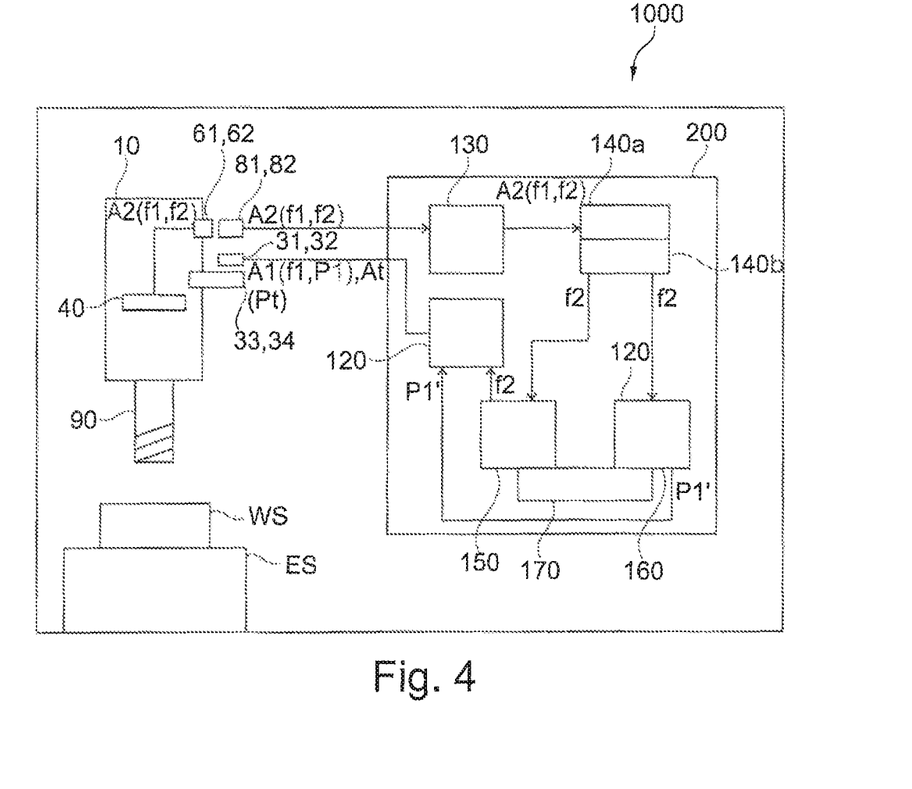
FIG. 4 shows schematically an embodiment of a machine tool according to the invention.

FIG. 4 shows schematically a device according to the invention, by means of which the method according to the invention can be carried out.

The device can be part of a machine tool 1000. This figure shows a tool holder 10 having a piezoelectric sensor element 40, the structure of which corresponds, by way of example, to the tool holder 10 shown in FIG. 1. The tool 90 is received at the tool holder 10 for the ultrasonic machining of workpieces.

A generator 120 outputs a work signal A1 as the drive signal for the piezo drive in the tool holder 10. The work signal A1 has the work frequency f1 and is transferred in contactless manner with the power P1 via the energy generation device 30, which is made as a transformer consisting of primary winding 32 plus first pot core 31 and secondary winding 34 plus second pot core 33, to the rotating tool holder 10. Furthermore, the generator 120 outputs a test signal At of a power Pt<P1, which is superimposed to the work signal A1 and the frequency of which varies in a range of f1.

On account of the signals A1 and At, the vibratory system in the tool holder 10 is induced to vibrate, the frequency spectrum of said vibration substantially having two frequencies.

On account of the vibration of the vibratory system, the piezoelectric sensor element 40 also vibrates in the same way and thus produces an electric sensor signal A2, which contains the information on the frequency spectrum of the vibration.

The sensor signal A2 is read out in contactless fashion e.g. via another transformer which consists of primary winding 62 plus first ferrite core 61 and secondary winding 82 plus second ferrite core 81, from a readout device 130 from the rotating tool holder 10 and is transferred to an analysis apparatus 140*a*.

The analysis apparatus 140*a* identifies the frequencies contained in the frequency spectrum of A2, and therefore the frequency of the maximum peak in the spectrum (main frequency) can be associated with the work frequency f1 in an apparatus for determining the resonance frequency 140*b*, which can be realized as part of the analysis apparatus 140*a*, and the frequency of the smaller peak in the spectrum (auxiliary frequency) can be associated with the resonance frequency f2. The readout device 130, the analysis apparatus 140*a* and the apparatus for determining the resonance frequency 140*b* can also be combined into two apparatuses or be realized as a single device.

The value of the determined resonance frequency f2 is transmitted to a first control device 150 which controls the generator 120 in such a way that the frequency f1 of the work signal A1 is adjusted to the value of the resonance frequency f2.

Alternatively or additionally, the value of the determined resonance frequency f2 can be transmitted to a second control apparatus 160, which controls the generator 120 in such a way that the power P1, by means of which the work signal A1 is irradiated into the tool holder 10, is increased to a power P1', such that the mechanical vibration amplitude is achieved even in the case of an excitation where f1≠f2, wherein said amplitude would be attained as the maximum amplitude in an excitation with the resonance frequency f2.

It is thus possible to stabilize the mechanical vibration amplitude of the tool tip to a certain value, which has a positive effect on the precision during machining with the tool 90. When the vibration amplitude is stabilized to the value which is the possible maximum in the case of a certain power, the efficiency of the workpiece processing is also increased.

A user of the device can control the first control apparatus 150 and/or the second control apparatus 160 via a user interface 170 such that the work signal A1 is only adjusted at the command of the user or when a predetermined condition applies. The user can also determine that the work signal A1 is automatically adjusted at regular or irregular intervals on the basis of the last determined resonance frequency f2.

The generator 120, the readout apparatus (or detection apparatus) 130, the analysis apparatus 140*a* and the first control apparatus 150 can be combined into a device 200 for outputting output signals and receiving input signals, wherein a first output signal of this device 200 corresponds to the work signal A1, a second output signal corresponds to the test signal At and an input signal corresponds to the sensor signal A2.

In the above mentioned example, the vibration of the tool can be controlled by the respective resonance frequency of the vibration system.

If the controlled resonance frequency or the resulting power changes when the tool or the tool tip is located at a boundary of two materials, this can be used according to embodiments of the invention to detect a change in the material.

On the one hand, this can be the identification of a boundary between two material layers in the workpiece. However, this can also be a boundary between the material of the workpiece, e.g. in the case of entrapped air, cavities, bores, etc. in the workpiece or also on the surface of the workpiece (air to workpiece surface) e.g. for detecting the first contact with the workpiece.

Examples and embodiments of the present invention and the advantages thereof are described in detail above with reference to the attached drawings.

However, it should be noted once again that the present invention is by no means limited or confined to the above described embodiments and the design features thereof but also comprises modifications of the design features, in particular those which are comprised by modifications of the features of the described examples or by combination of individual or a plurality of features of the described examples within the scope of protection of the independent claims.

The invention claimed is:

1. A method for machining a workpiece on a numerically controlled machine tool by a tool held in a tool receiving portion of a tool holder, the method comprising:
    controlling a relative movement of the tool relative to the workpiece for machining the workpiece based on predetermined processing parameters;
    producing an ultrasonic vibration of the tool by an ultrasonic generator provided in the tool holder, the tool holder being removably received in the machine tool;
    detecting at least one sensor signal outputted from the ultrasonic generator;
    identifying a change in a material of the workpiece while controlling the relative movement of the tool relative to the workpiece based on the at least one sensor signal outputted from the ultrasonic generator, and detecting a temporal change over time and a change in value of one or more parameters of the at least one sensor signal outputted from the ultrasonic generator;
    determining whether the temporal change over time and the change in the value of the one or more parameters of the at least one sensor signal correspondingly fall below a predetermined modification time and simultaneously exceed a predetermined modification value; and
    adjusting the predetermined processing parameters when the temporal change and the change in the value of the one or more parameters of the at least one sensor signal correspondingly fall below the predetermined modification time and simultaneously exceed the predetermined modification value.

2. The method according to claim 1, wherein
    the workpiece includes at least two different material regions, and
    a transition of the workpiece from a first material region of the at least two different material regions to a second material region of the at least two different material regions of the workpiece is identified during identifying the change in the material of the workpiece.

3. The method according to claim 2, wherein the workpiece includes a composite material including at least one of a carbon fiber-reinforced composite material, a glass, and a ceramic material.

4. The method according to claim 2, wherein the at least two material regions are layers of different materials or material characteristics.

5. The method according to claim 2, wherein the at least two material regions are material inclusions in the workpiece.

6. The method according to claim 2, wherein the at least two material regions are bores or recesses in the workpiece.

7. The method according to claim 1, wherein contact of the tool with a surface of the workpiece is identified during identifying the change in the material of the workpiece.

8. The method according to claim 1, wherein the adjustment of the predetermined processing parameters includes at least an adjustment of a speed or a feed of the relative movement of the tool.

9. The method according to claim 1, wherein the adjustment of the predetermined processing parameters includes at least adjusting a frequency or a power of the ultrasonic generator.

10. The method according to claim 1, wherein the ultrasonic generator is a piezo actuator system.

11. The method according to claim 1, wherein the tool has at least one geometrically determined cutting edge or at least one geometrically undetermined cutting edge.

12. A non-transitory computer-readable data storage medium having stored therein a computer program causing a computer of a numerically controlled machine tool or an external computer connected to the numerically controlled machine tool, to carry out the method according to claim 1 on the machine tool.

13. A device for use on a machine tool for machining the workpiece by the tool according to the method of claim 1, wherein the tool holder is removably received in the machine tool, and the machine tool includes (i) a controller configured to control the relative movement of the tool relative to the workpiece in order to process the workpiece, (ii) the ultrasonic generator configured to produce ultrasonic vibration of the tool, the ultrasonic generator being provided in the tool holder, and (iii) a sensor configured to detect the at least one sensor signal outputted from the ultrasonic generator, the device comprising:
    a processor configured to identify a change in the material of the workpiece while controlling the relative movement of the tool relative to the workpiece based on the at least one sensor signal outputted from the ultrasonic generator.

14. A machine tool for manufacturing the workpiece by the tool held in the tool receiving portion of the tool holder, the tool holder being removably received in the machine tool, the machine tool comprising:
    a controller configured to control the relative movement of the tool relative to the workpiece for manufacturing the workpiece,
    an ultrasonic generator configured to generate ultrasonic vibration in the tool, and
    the sensor configured to detect the at least one sensor signal outputted from the ultrasonic generator using the device according to claim 13.

* * * * *